United States Patent [19]
Kato

[11] Patent Number: 5,852,491
[45] Date of Patent: Dec. 22, 1998

[54] DISTANCE MEASURING APPARATUS

[75] Inventor: Masahiko Kato, Akiruno, Japan

[73] Assignee: Olympus Optical Co., Ltd., Tokyo, Japan

[21] Appl. No.: 857,063

[22] Filed: May 15, 1997

[30] Foreign Application Priority Data

May 20, 1996 [JP] Japan .................................... 8-124654
May 8, 1997 [JP] Japan .................................... 9-118225

[51] Int. Cl.[6] .............................. G01C 3/08; G01S 13/08
[52] U.S. Cl. ............................ 356/5.01; 342/135; 327/72
[58] Field of Search .......................... 356/5.01; 342/135; 327/69, 72

[56] References Cited

U.S. PATENT DOCUMENTS 3,763,436 10/1973 Haw ........................................ 328/147
5,523,835 6/1996 Tanaka .................................... 356/5.05
5,726,742 3/1998 Nourrcier ............................... 358/5.01

FOREIGN PATENT DOCUMENTS 6-109841 4/1994 Japan .
6-201828 7/1994 Japan .

*Primary Examiner*—Mark Hellner
*Attorney, Agent, or Firm*—Frishauf, Holtz, Goodman, Langer & Chick

[57] ABSTRACT

A distance measuring apparatus measures the time an emitted optical pulse requires to go and return the distance to a target before being received by using the emission time and the reception time of the optical pulse, and obtains the distance to the target from the measured time. A converter converts an optical pulse received by a photodetector into an electrical signal. A divider divides the electrical signal pulse into two signal pulses. A delay element delays only one signal pulse. Both the undelayed and delayed pulses are applied to a threshold generator. The threshold generator generates and holds the value of signal intensity at the intersection of waveforms of the two pulses as a threshold value of the received signal pulse. A comparator generates a digital signal pulse indicating the reception time from the received signal pulse by using the generated threshold value.

17 Claims, 13 Drawing Sheets

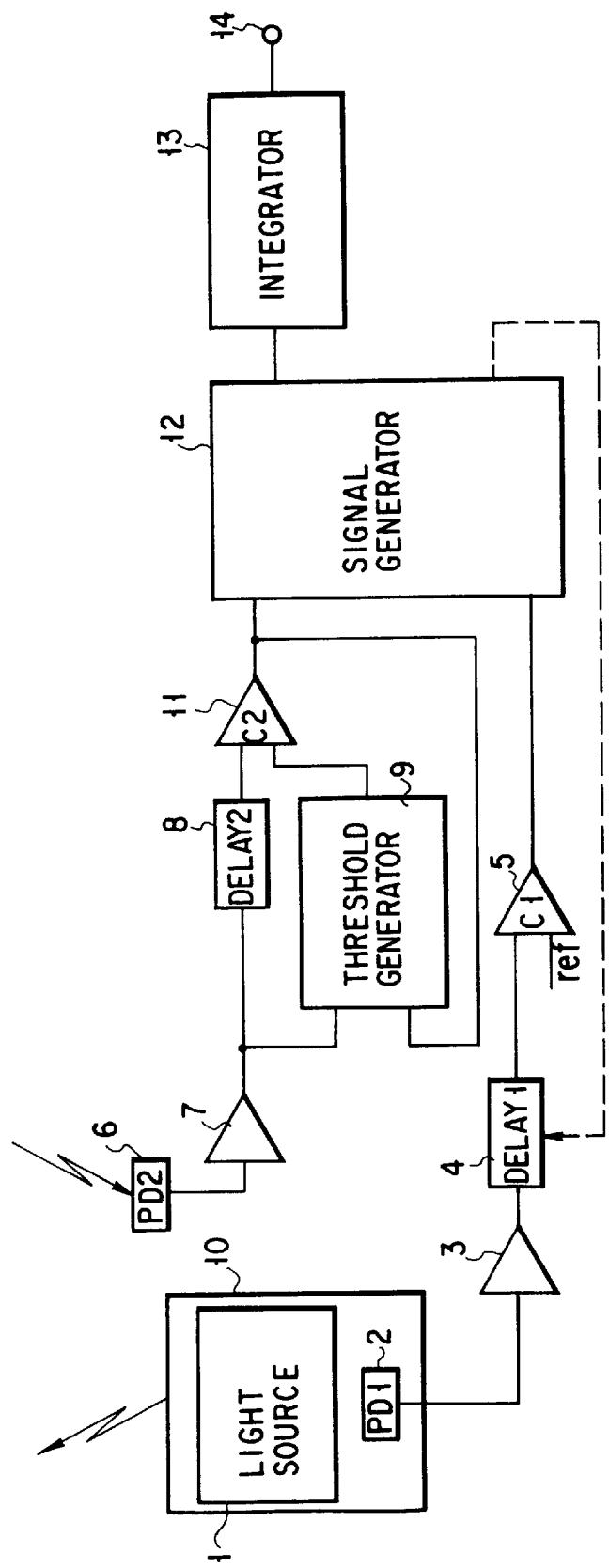
F I G. 1

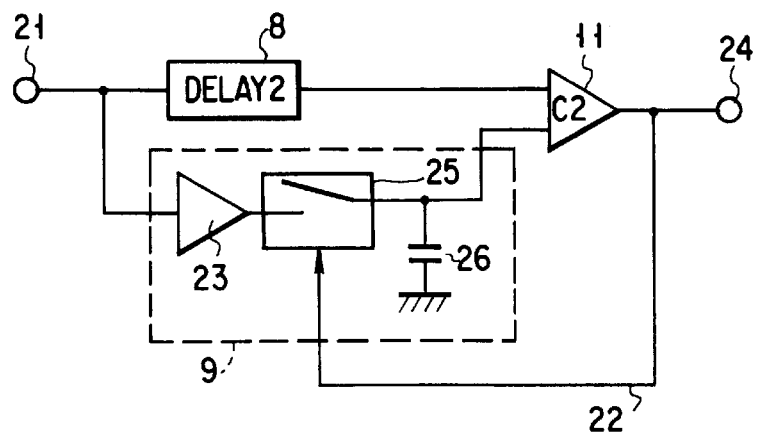
F I G. 2
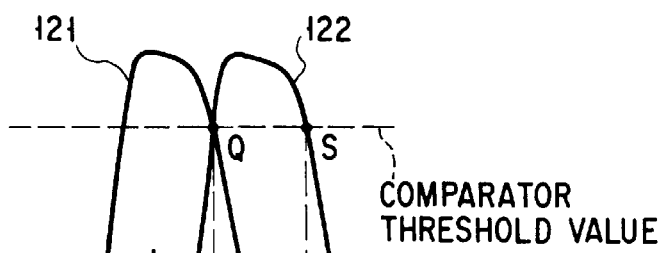
F I G. 3A
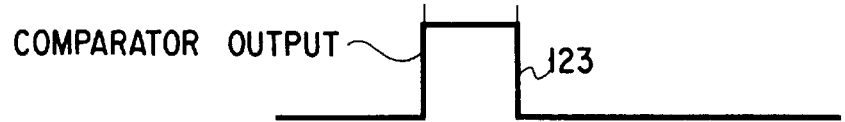
F I G. 3B

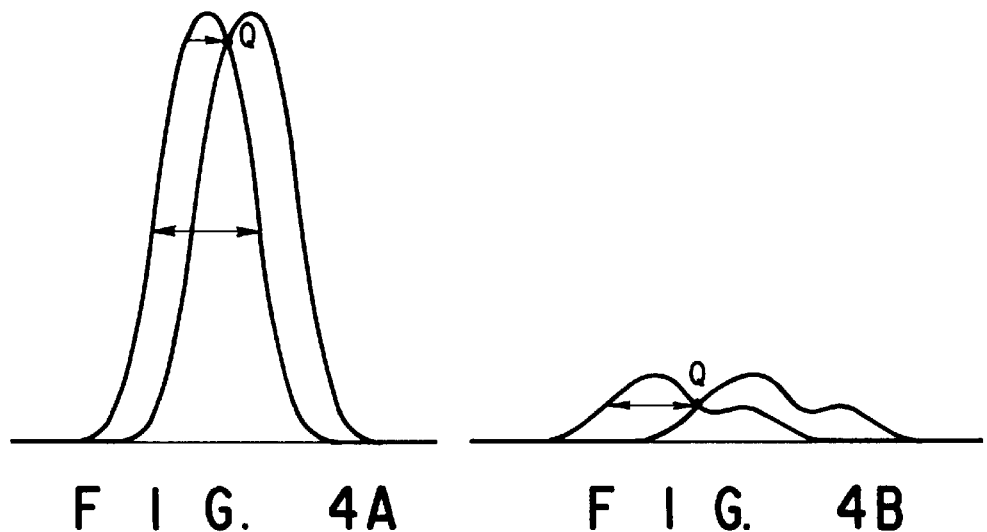
F I G. 4A    F I G. 4B
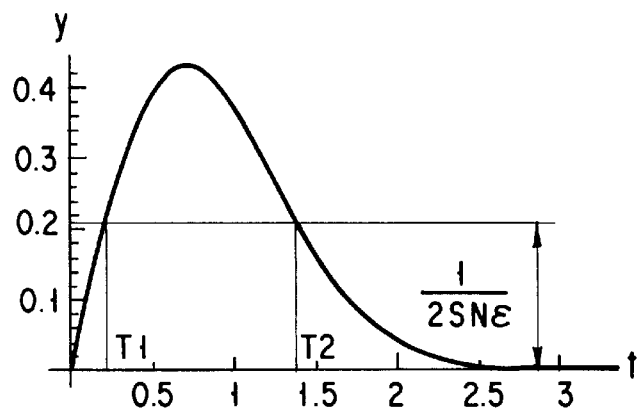
F I G. 4C
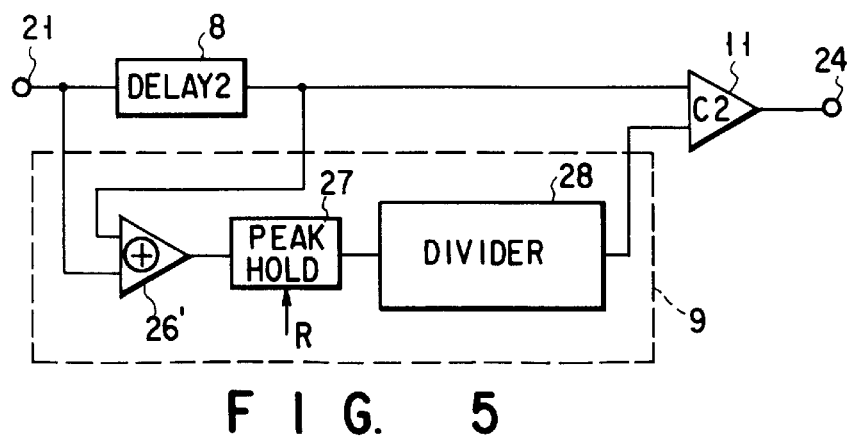
F I G. 5

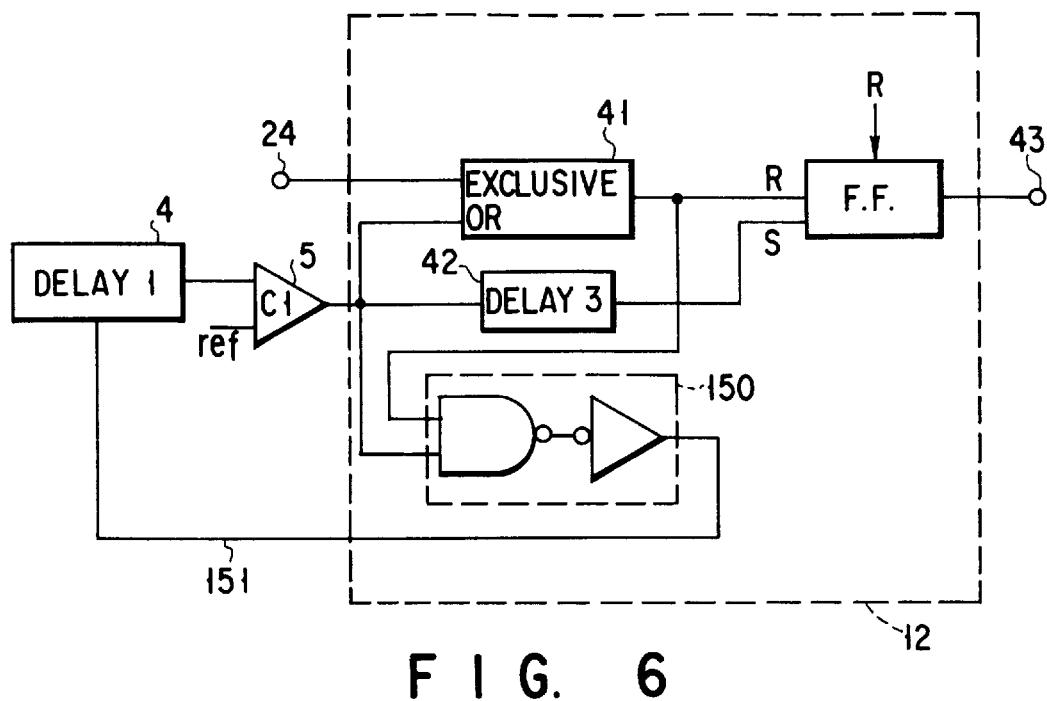
F I G. 6
F I G. 7A
F I G. 7B
F I G. 7C
F I G. 7D

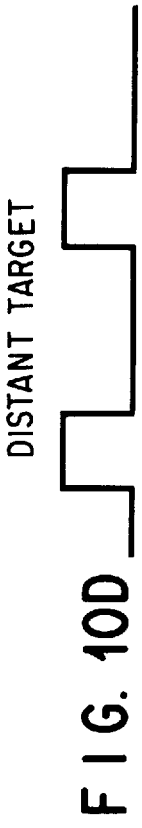
FIG. 10A EXCLUSIVE OR CLOSE TARGET
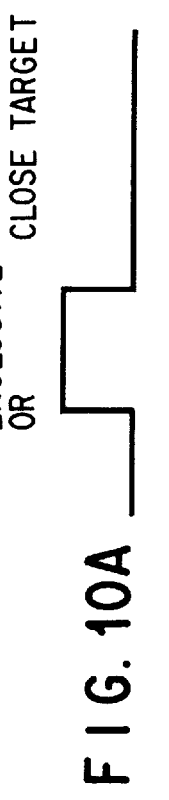
FIG. 10B START SIGNAL
FIG. 10C STOP SIGNAL
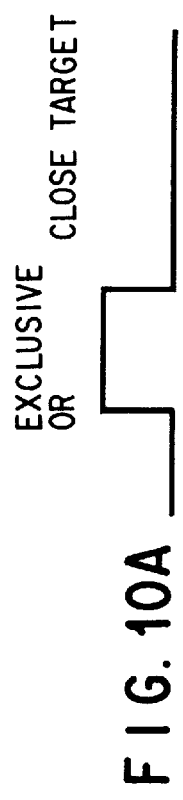
FIG. 10D DISTANT TARGET
FIG. 10E START SIGNAL
FIG. 10F STOP SIGNAL

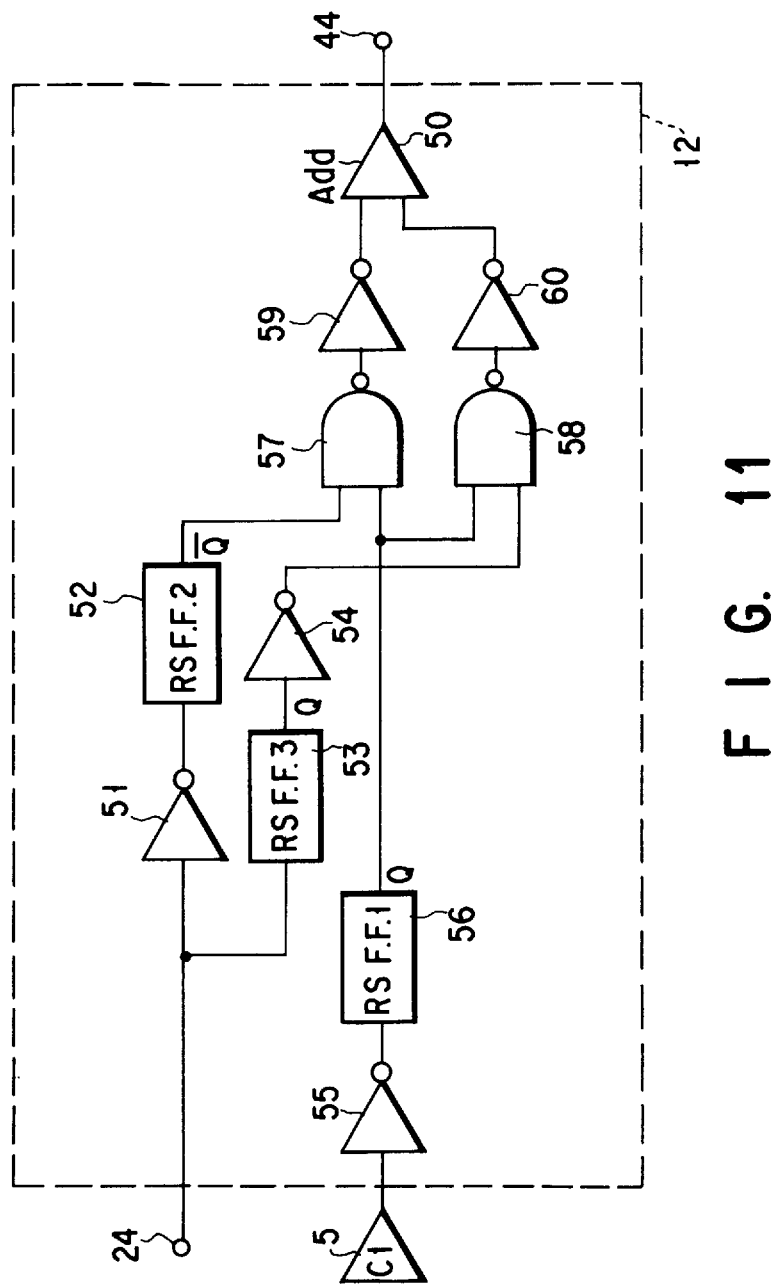
F I G. 11

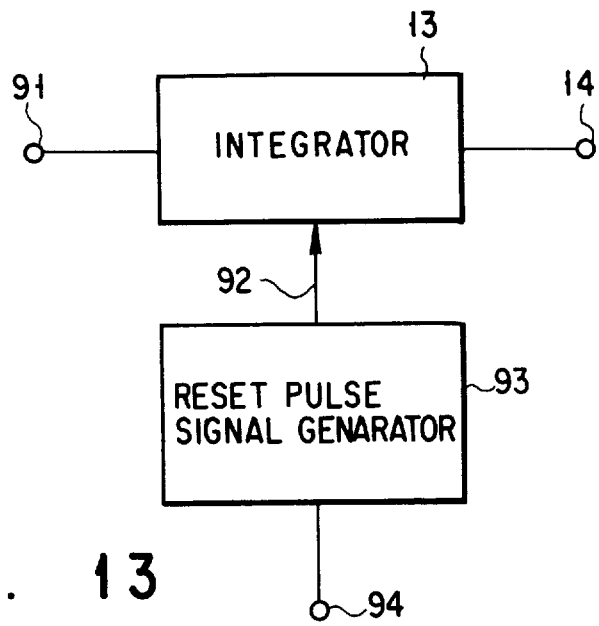
F I G. 13
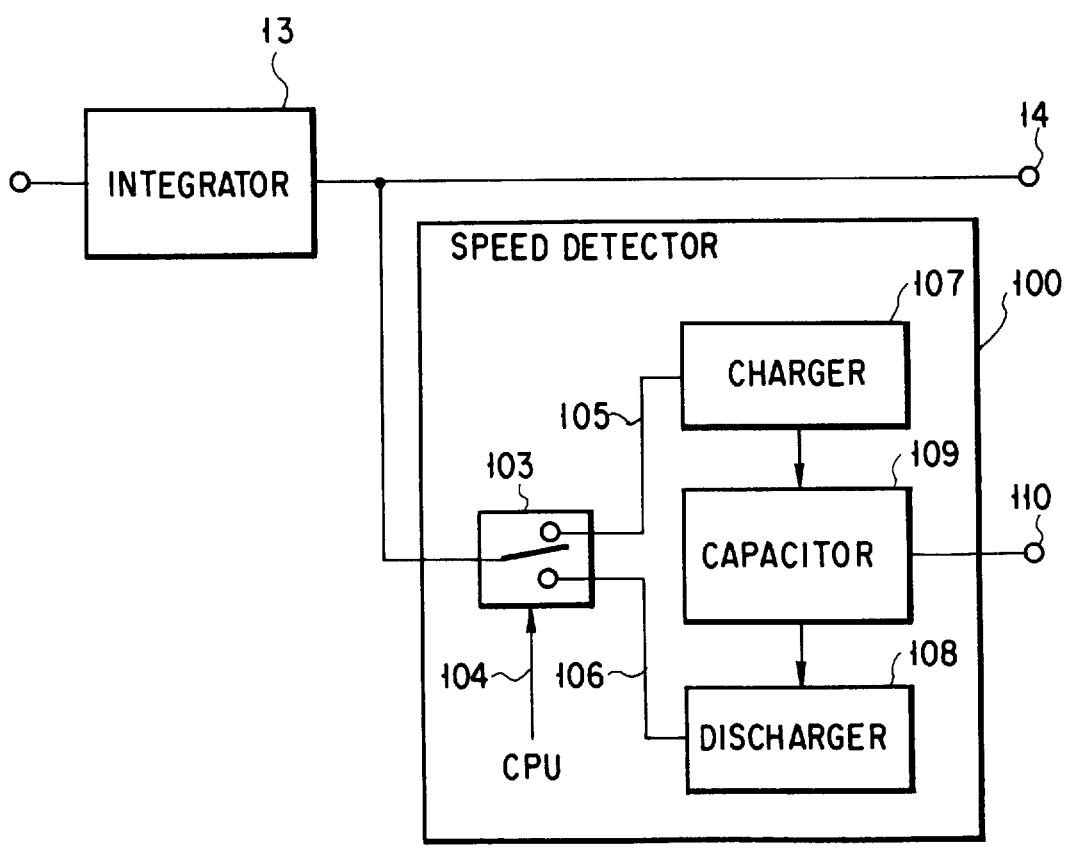
F I G. 14

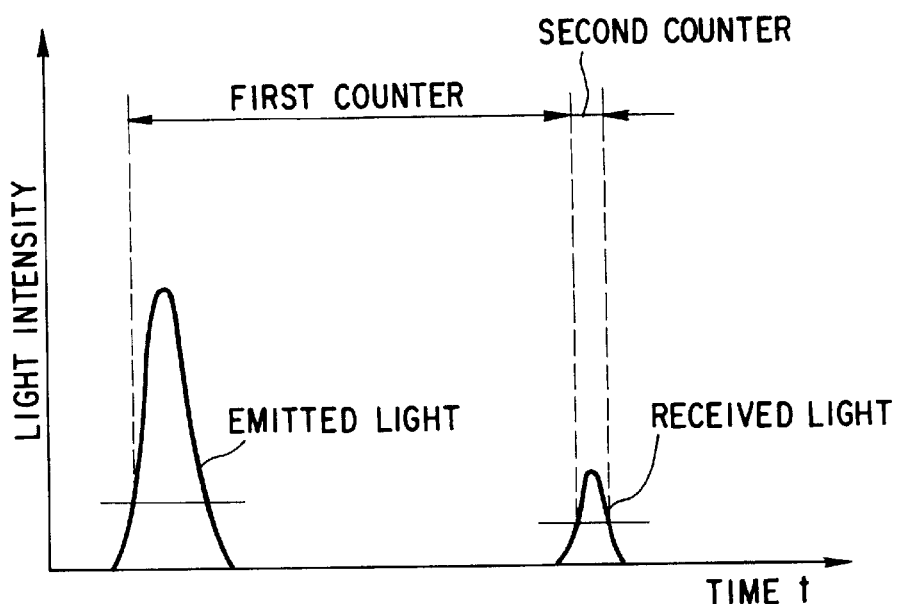
FIG. 17 (PRIOR ART)
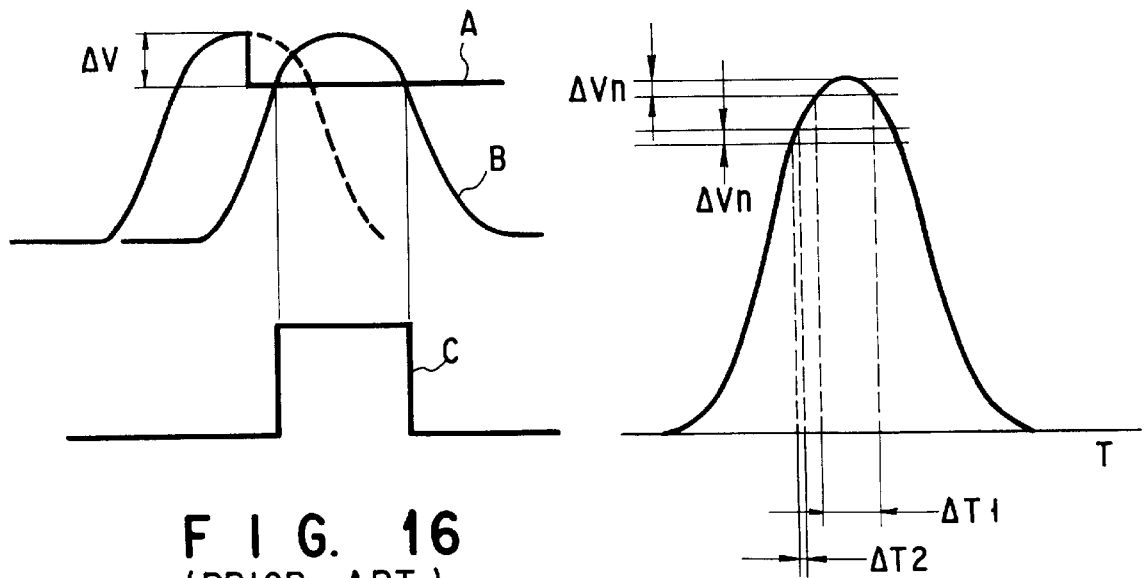
FIG. 16 (PRIOR ART)
FIG. 18 (PRIOR ART)

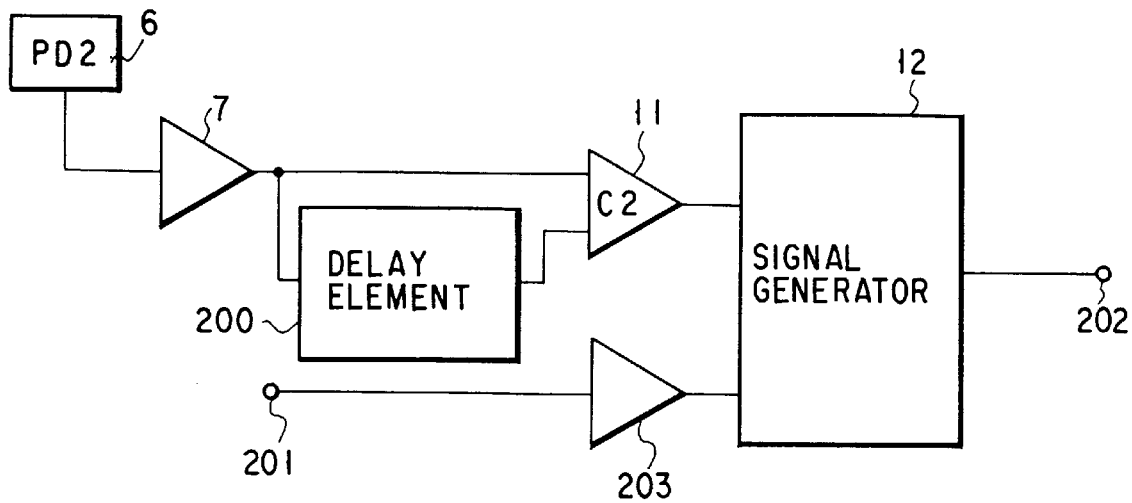
F I G. 19
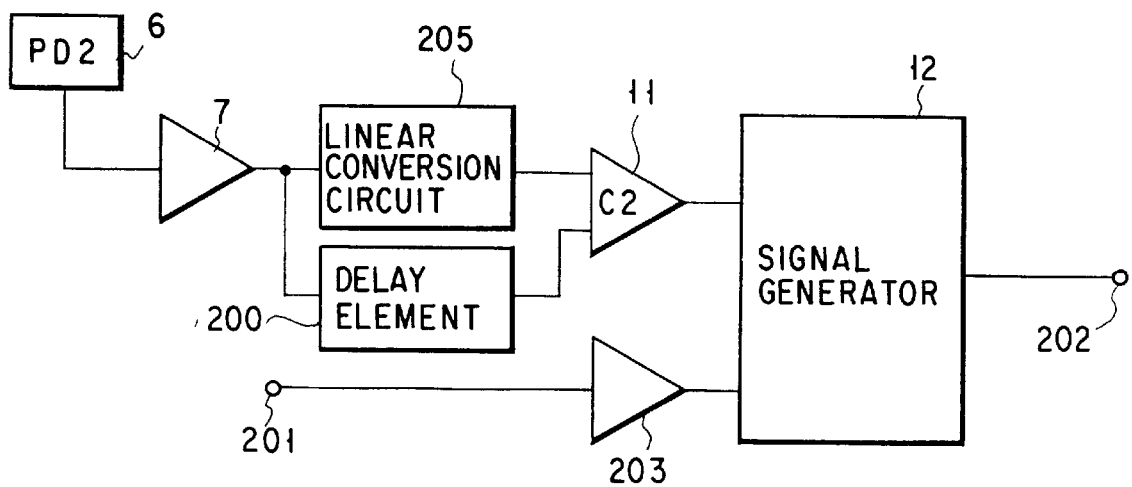
F I G. 20

DISTANCE MEASURING APPARATUS

BACKGROUND OF THE INVENTION

The present invention relates to a distance measuring apparatus and, more particularly, to a distance measuring apparatus which emits a pulse light beam, detects reflected light from an obstacle, and measures the time the light beam takes to complete the round-trip, thereby measuring the distance to and the relative speed of the obstacle.

A distance detection method by which the distance to an obstacle is measured by emitting an optical pulse and measuring the time the optical pulse requires to travel to and from the obstacle is well known. One example is a laser distance measuring apparatus disclosed in Jpn. Pat. Appln. KOKAI Publication No. 6-201828.

A particular problem of apparatuses of this sort is that the intensity of received light changes by at least four orders of magnitudes.

Accordingly, if the reception time is evaluated with a comparator having a fixed threshold value by using the rise characteristic of the received optical pulse, the measurement accuracy is considerably deteriorated because the rise characteristic largely changes depending on the intensity of the received optical pulse.

To alleviate this difficulty, the laser distance measuring apparatus disclosed in Jpn. Pat. Appln. KOKAI Publication No. 6-201828 compresses the number of orders of magnitudes of the light intensity change by using a logarithmic amplifier.

FIG. 15 is a block diagram of this laser distance measuring apparatus.

The apparatus comprises a light-emitting unit 310, a light-receiving unit 320, and a counter display unit 330.

The light-emitting unit 310 consists of a pulse generator 311, a laser beam generator 312, and a light-emitting optical system 313.

The light-receiving unit 320 consists of a light-receiving optical system 321, a photodetector 322, a logarithmic amplifier 323, a delay element 324, a peak-hold circuit 326, a level shifter 327, and a comparator 325.

An optical pulse emitted from the light-emitting optical system 313 is reflected by a target O and detected by the photodetector 322 via the light-receiving optical system 321.

The detected optical signal is subjected to the above processing of compressing the number of orders of magnitudes of the light intensity change done by the logarithmic amplifier 323.

Subsequently, the circuit consisting of the delay element 324, the peak-hold circuit 326, the level shifter 327, and the comparator 325 obtains a light reception timing pulse, in a manner as shown in FIG. 16, from the comparator 325 by using a threshold value shifted $\Delta V$ from the peak value of the optical signal.

More specifically, a curve A in FIG. 16 represents a threshold value held at a value shifted $\Delta V$ by the level shifter 327 from the value which is held by the peak-hold circuit 326. A curve B represents an optical signal delayed by the delay element 324.

A rectangular pulse C in FIG. 16 represents the output from the comparator 325.

The leading edge of this rectangular pulse C is considered as the light reception timing pulse.

The shape of the peak of the received optical pulse does not change very much even when the light intensity largely changes. By using this property, a position having a predetermined relationship with the peak position of the received optical pulse is regarded as the timing of light reception.

A counter display unit 330 starts counting time in accordance with a start pulse obtained from the laser beam generator 312. The unit 330 stops the counting by using the light reception timing pulse described above as a stop signal and displays the distance to the target O in accordance with the count.

Two counters are used in a distance detection method disclosed in Jpn. Pat. Appln. KOKAI Publication No. 6-109841, which discloses another prior art technique.

In this distance detection method, as shown in FIG. 17, a first counter counts from the leading edge of the emitted light to the leading edge of the received light.

A second counter counts the width of the received optical pulse, and a half width is regarded as the peak position of the received optical pulse. In this way the method improves the distance measurement accuracy.

Note that the threshold values used in the measurements by the first and second counters are fixed.

In measuring the time from emission of an optical pulse to detection of the received optical pulse, the peak position of the received optical pulse remains almost unchanged even if the intensity of the received optical pulse changes.

Accordingly, most conventional systems obtain a peak value in some sense and define this peak value as the timing of light reception.

The apparatus disclosed in Jpn. Pat. Appln. KOKAI Publication No. 6-201828 holds the peak and obtains a timing pulse by using a threshold value shifted $\Delta V$ from the peak.

In the method disclosed in Jpn. Pat. Appln. KOKAI Publication No. 6-109841, the middle point of the pulse width of the rectangular pulse as the comparator output obtained by the fixed threshold value of the received optical pulse is used as an approximate point of the peak position.

As described above, these conventional techniques exclusively use the peak position as a reference point. That is, the conventional techniques do not use, as a reference point, a portion around the peak position or the peak of the received optical pulse, where the signal intensity drastically changes.

As shown in FIG. 18, when the peak position or the peak of the received optical pulse is used as a reference point, a measurement time width $\Delta T_1$ corresponding to a width $\Delta V_n$ of noise superposed on the received pulse is much larger than a time width $\Delta T_2$ when a portion around the peak, where the signal intensity drastically changes, is used as a reference point.

In other words, if the same noise is superposed, the time measurement accuracy when the peak of the received optical pulse is used as a reference point is much inferior to that when a portion where the signal intensity drastically changes around the peak is used as a reference point.

Also, the measurement accuracy or the resolution is determined by the minimum time resolution corresponding to one count of a clock pulse or a counter. Therefore, even when a signal-noise (SN) ratio at short distances is high, the minimum time resolution is determined by one count of the clock pulse and cannot be raised from the determined value.

BRIEF SUMMARY OF THE INVENTION

The present invention has been made in consideration of the above problems of the conventional techniques and has its object to provide a distance measuring apparatus capable of high-accuracy, high-speed distance measurement with a simple arrangement even when the intensity of the received optical pulse changes.

A distance measuring apparatus of the present invention for achieving the above object is an apparatus for measuring a distance to a target by measuring a time that an emitted light pulse takes to go to the target and back, comprising: converting means for receiving a light pulse reflected by the target, and for converting the light pulse into an electrical signal; a delay element for giving a delay to the electrical signal; a threshold generator for receiving the electrical signal from the converting means and the delayed electrical signal from the delay element, and for holding, as a threshold, a signal level where the electrical signal from the converting means and the delayed electrical signal from the delay element are coincident; and a comparator for generating a signal corresponding to the time when the converting means receives the reflected light pulse by using the threshold.

An embodiment shown in FIG. 1 corresponds to this distance measuring apparatus.

A circuit configuration in FIG. 2 corresponds to the threshold generator, but a modification shown in FIG. 5 is also included.

As the effect of this distance measuring apparatus, a received optical pulse is converted into an electrical signal pulse, the electrical signal pulse is substantially divided into two signal pulses, only one signal pulse is passed through a delay element, the two signal pulses are applied to a threshold generator, the threshold generator generates and holds a value of signal intensity at an intersection of waveforms of the two signal pulses as a threshold value of the received signal pulse, and a comparator generates a digital signal pulse indicating a reception time from the received signal pulse by using the generated threshold value. Therefore, a value in a portion where the signal intensity drastically changes around the peak of the received signal light is chosen as a threshold value.

Since the signal intensity change is larger at such portion than that at the peak, the operation is less affected by noise.

Another distance measuring apparatus of the present invention is a distance measuring apparatus for measuring a time an emitted optical pulse requires to go and return a distance to a target before being received by using an emission time and a reception time of the optical pulse, and obtaining the distance to the target from the measured time, comprising: a light-emitting unit for emitting an optical pulse; a first photodetector for detecting the output from the light-emitting unit; a first comparator for comparing an output from the first photodetector with a predetermined threshold value; a second photodetector for receiving scattered light from the target; a delay element for delaying an output from the second photodetector; a threshold generator for holding, as a threshold value, a value of signal intensity at an intersection of the output from the second photodetector and an output from the delay element; a second comparator for comparing the output from the delay element with an output from the threshold generator; a signal generator for generating an output corresponding to the emission time and the reception time on the basis of an output from the first comparator and an output from the second comparator; and an integrator for integrating the output from the signal generator.

The embodiment shown in FIG. 1 corresponds to this distance measuring apparatus. The circuit configuration in FIG. 2 corresponds to the threshold generator, but the modification shown in FIG. 5 is also included.

A circuit configuration in FIG. 8 corresponds to the signal generator, but a modification shown in FIG. 11 is also included.

In this distance measuring apparatus, the pulse width of the output from the signal generator is equivalent to the time the optical pulse requires to go and return the distance to the target, so the amount of charge stored by integrating this pulse width by the integrator takes a value corresponding to the time or the distance to the target.

Since this value continuously changes, factors limiting the measurement accuracy or the resolution are restricted to those determined by the SN ratio of the signal.

As in the first distance measuring apparatus, a value in a portion around the peak of the received signal light, where the signal intensity drastically changes, is selected as a threshold value. Therefore, the signal intensity change is larger at such portion than that at the peak, so the operation is not easily affected by noise.

Also, the light-emitting unit can comprise means for applying a portion of the emitted output light to the second photodetector.

This corresponds to embodiments shown in FIGS. 9A and 9B.

In these embodiments, scattered light from a member arranged in the vicinity of the light-emitting unit or a portion of the emitted output light can be used in the generation of a start signal for integration.

The delay time in the second delay element is desirably 30 to 100% of the full-width at half maximum of the received optical pulse.

This corresponds to explanation in FIGS. 4A and 4B.

The effect of this embodiment is as follows. When the delay time shifts 30 to 100% of the full-width at half maximum of the optical pulse, the intersection of a portion of the output from the second photodetector and the output from the second delay element moves from the peak where the signal intensity gradually changes. Consequently, a threshold value is set in a portion around the peak, where the signal intensity drastically changes. Additionally, measurement can be performed at a high SN ratio because the background noise level has no effect in that portion.

The threshold generator can also hold the value of the signal intensity at the intersection of the output from the second photodetector and the output from the second delay element, as a threshold value, in accordance with the output from the second comparator which is fed back to the threshold generator.

This corresponds to the embodiment in FIG. 2.

The effect of this embodiment is as follows. The value of the second delay element is chosen from a time range equivalent to 30 to 100% of the full-width at half maximum of the received optical pulse. The output from this delay element is applied to the second comparator, and the output from the second comparator is fed back to the threshold generator. Consequently, a threshold value can be set in a region around the peak of the received optical signal, where the signal intensity change is larger than that at the peak. Therefore, it is possible to generate distance measurement start and stop signals which are not easily affected by noise.

The threshold generator can also comprise a peak value holding circuit for holding the peak value of the sum of the output from the second photodetector and the second delay element, and can hold the half value of this peak value as a threshold value.

This corresponds to the embodiment shown in FIG. 5 and can approximately respond at a high speed.

The signal generator can also comprise a logic circuit for exclusively ORing the output from the first comparator and the output from the second comparator, a third delay element for delaying the output from the first comparator, and a flip-flop which is turned on (set) by the output from the third delay element and turned off (reset) by the output signal from the logic circuit.

This corresponds to the embodiment shown in FIG. 8.

In this embodiment, the exclusive OR logic circuit turns on (sets) the flip-flop by using scattered light from a member arranged in the vicinity of the light-emitting unit or a portion of the emitted output light. Additionally, even when it is not possible to use the scattered light from the member arranged close to the light-emitting unit or a portion of the emitted output light, the flip-flop can be turned on by the output from the first comparator.

The flip-flop is turned off (reset) by the optical signal from the target.

Since the distance measurement start and stop signals use a common digital circuit, the signal generator is not easily affected by drifts of the delay time or changes in characteristics with temperature changes of the digital circuit.

The signal generator can also output a digital output equivalent to a start signal for the integrator in accordance with the output from the first comparator, and digital outputs equivalent to two different stop signals for the integrator in accordance with the leading and trailing edges of the output from the second comparator.

This corresponds to an embodiment shown in FIG. 11.

In this embodiment, a stop signal corresponding to the peak position of the received optical signal can be approximately obtained by generating two different stop signals corresponding to the leading and trailing edges of the output from the second comparator and calculating the average of the two signals.

It is desirable that the first delay element comprise a fixed delay element with a fixed delay amount and a variable delay element with a variable delay amount controlled by the output from the signal generator.

This corresponds to an embodiment shown in FIG. 6.

The effect of this embodiment is as follows. The delay amount of the signal pulse from the first photodetector is changed by controlling the delay amount of the first delay element by the variable delay element which is controlled by the output from the signal generator. This decreases any delay error between the signal pulse from the first photodetector and the signal pulse from the second photodetector. Consequently, an improvement of the accuracy of distance measurement can be expected.

It is desirable that the apparatus further comprise a reset pulse signal generator for applying a reset pulse signal to the integrator after a distance is measured a plurality of number of times.

This corresponds to an embodiment shown in FIG. 13.

With this arrangement, the average value of values obtained by measuring distance a plurality of number of times can be calculated at a high speed by hardware.

It is also desirable that the apparatus further comprise a speed detector consisting of a switch for switching the route of a portion of the output from the integrator under the control of a controller, a charger and a discharger connected to the switch, and a capacitor connected to the charger and the discharger.

This corresponds to an embodiment shown in FIG. 14.

With this arrangement, the measured values of speed can be calculated by dedicated hardware. Accordingly, the calculation can be performed at a much higher speed than when it is done by software.

It is desirable that the apparatus further comprises a linear conversion circuit for shifting an output level of either one of the received electrical signal and the received electrical signal delayed by the delay element.

This corresponds to an embodiment shown in FIG. 20.

It is also desirable that the linear conversion circuit has a function of multiplying, by a coefficient, an amplitude of either one of the received electrical signal and the received electrical signal delayed by the delay element.

This corresponds to an embodiment shown in FIG. 20.

Still another distance measuring apparatus of the present invention is a distance measuring apparatus for measuring a time an emitted optical pulse requires to go and return a distance to a target before being received by using an emission time and a reception time of the optical pulse, and obtaining the distance to the target from the measured time, comprising: converting means for converting a received optical pulse into an electrical signal as a received electrical signal pulse; a delay element for delaying the received electrical signal pulse; a threshold generator for holding, as a threshold value, a half value of a peak value of a sum of the received electrical signal pulse and the received electrical signal pulse delayed by the delay element; and a comparator for generating a signal corresponding to the reception time from the received electrical signal pulse by using the threshold value generated by the threshold generator.

This corresponds to an embodiment shown in FIG. 5.

It is desirable that the delay time in the delay element is desirably 30 to 100% of the full-width at half maximum of the received electrical signal pulse.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the arrangement of one embodiment of a distance measuring apparatus according to the present invention;

FIG. 2 is a block diagram showing one practical example of a threshold generator in FIG. 1;

FIGS. 3A and 3B are views for explaining the operation of the threshold generator in FIG. 2;

FIGS. 4A, 4B, and 4C are graphs for explaining the delay amount in a second delay element;

FIG. 5 is a block diagram showing another practical example of the threshold generator in FIG. 1;

FIG. 6 is a block diagram showing a configuration for controlling the variable portion of a first delay element;

FIGS. 7A to 7D are timing charts for explaining the operation of the configuration in FIG. 6;

FIGS. 10A to 10F are timing charts for explaining the operation of the signal generator in FIG. 8;

FIG. 11 is a block diagram showing another practical example of the signal generator in FIG. 1;

FIG. 13 is a view for explaining a reset pulse signal generator added to an integrator;

FIG. 14 is a block diagram showing a modification for obtaining relative speed;

FIG. 16 is a view for explaining the principle of the distance measuring apparatus in FIG. 15;

FIG. 17 is a graph for explaining the principle of another conventional distance measuring apparatus;

FIG. 18 is a graph for explaining the problem of the conventional distance measuring apparatus;

FIG. 19 is a block diagram showing another embodiment of a distance measuring apparatus according to the present invention;

FIG. 20 is a block diagram for explaining a modification of the embodiment in FIG. 19.

DETAILED DESCRIPTION OF THE INVENTION

Figure 8:
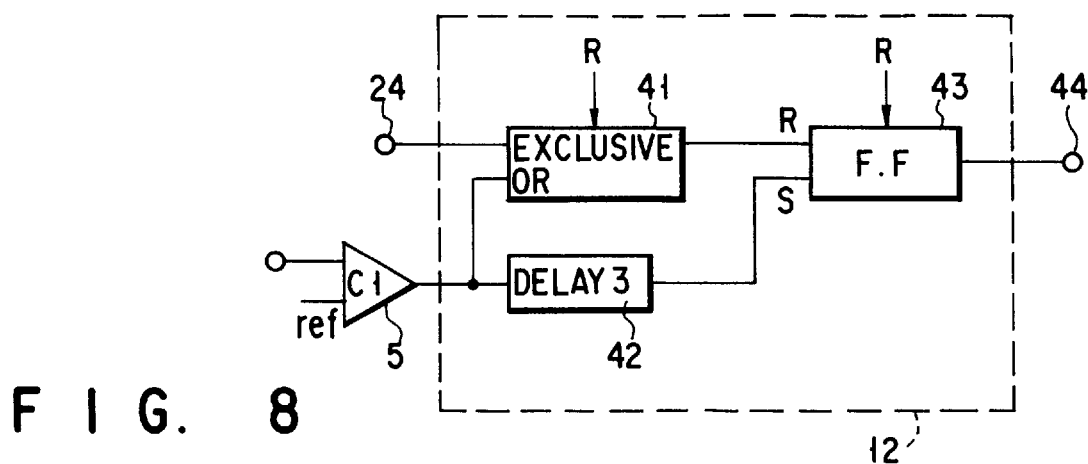
FIG. 8 is a block diagram showing one practical example of a signal generator in FIG. 1.

Reference will be made in detail to the presently preferred embodiments of the invention as illustrated in the accompanying drawings, in which like reference characters designate like or corresponding parts throughout the several drawings.

Embodiments of a distance measuring apparatus of the present invention will be described in detail below.

FIG. 1 is a block diagram showing the arrangement of one embodiment of the present invention.

This distance measuring apparatus comprises a light-emitting unit 10 consisting of a light source 1, a first photodetector (PD1) 2, and an optical system (not shown). The apparatus also comprises a first amplifier 3, a first delay element 4, a first comparator 5, a second photodetector (PD2) 6, a second amplifier 7, a second delay element 8, a threshold generator 9, a second comparator 11, a signal generator 12, an integrator 13, and an output terminal 14.

The first photodetector 2 is, e.g., a PIN photodiode incorporated into the light source 1 and detects the waveform of an emitted optical pulse.

This waveform is applied to the first comparator 5 via the first amplifier 3 and the first delay element 4.

The first delay element 4 is formed by connecting a delay element with a fixed delay time and a delay element with a variable delay time which is controlled by the output signal from the signal generator 12.

The threshold value (ref) of the first comparator 5 is variable and can be set to an arbitrary value in a portion around the peak of the emitted optical pulse, where the light intensity changes more drastically.

The optical pulse emitted from the light-emitting unit 10 is reflected by a target. This reflected pulse is detected by the second photodetector 6 via the optical system (not shown) and amplified by the second amplifier 7.

As this second amplifier 7, a logarithmic amplifier, an AGC (Automatic Gain Controller), or the like device can be used.

A portion of the output from the second amplifier 7 is supplied to the second delay element 8. The rest of the output is supplied to the threshold generator 9.

FIG. 2 shows a practical example of this threshold generator 9.

Referring to FIG. 2, a portion of the output supplied from the second amplifier 7 to an input terminal 21 is supplied to the second delay element 8 and given a predetermined delay $T_d$.

The rest of the output is supplied to the threshold generator 9.

The output supplied to the threshold generator 9 is first supplied to a switch 25 via a buffer amplifier 23.

This switch 25 is controlled by a signal fed back from the output of the second comparator 11 through a conductor 22.

When the output from the second comparator 11 is OFF (output voltage 0), the switch 25 is ON, and the output from the buffer amplifier 23 is applied to one terminal of the second comparator 11 to supply a reference voltage.

At this time, a capacitor 26 holds this reference voltage for a predetermined time.

When the output from the comparator 11 is inverted and turned on, the switch 25 is opened, and the charge stored in the capacitor 26 is held.

More specifically, as shown in FIG. 3A, when the output from the second amplifier 7 is represented by a waveform 121, the waveform delayed $T_d$ by the second delay element 8 is represented by 122.

The reference voltage changes in accordance with the waveform 121. The output from the comparator 11 is turned on at an intersection Q of the waveforms 121 and 122. Consequently, the switch 25 is opened, and the voltage value at the intersection Q is held as a threshold value.

At an intersection S of this threshold value and the waveform 122, the output from the second comparator 11 is again turned off.

Consequently, a comparator output of the second comparator 11 indicated by a waveform 123 in FIG. 3B is obtained.

The delay $T_d$ in the second delay element 8 is preferably equivalent to 30 to 100% of the pulse width (full-width at half maximum) at half maximum of the peak value of the above optical pulse.

This reason will be described below with reference to FIGS. 4A, 4B, and 4C.

FIG. 4A shows a received signal with a high SN ratio from a target at a short distance. In FIG. 4A, the delay $T_d$ is 38% of the full-width at half maximum of the optical pulse.

FIG. 4B shows a received signal with a low SN ratio from a target at a long distance. The peak value of the optical pulse in FIG. 4B is three to four orders of magnitudes smaller than the peak value in FIG. 4A. In FIG. 4B, the delay $T_d$ is 100% of the full-width at half maximum of the optical pulse.

Referring to FIG. 4A, the intersection Q exists slightly below the peak of the optical pulse. If the delay amount is smaller than this one, the overlap of the optical pulse and the delayed optical pulse is enlarged. Consequently, the intersection moves too close to the peak of the optical pulse and becomes inadequate for the measurement.

FIG. 4B shows an example in which the pulse is almost buried with noise, so no more delay is desirable.

This can be explained as follows by using mathematical expressions.

For the sake of simplicity, the waveform of the received optical pulse is approximated by $v=\exp(-t^2)$ (v: normalized signal voltage, t: normalized time). Assuming the uncertainty of the reception time when noise $\Delta v$ is applied to a signal voltage is $\Delta t$, $\Delta t=(dt/dv)\Delta v$. Since $dt/dv=-1/\{2t\cdot\exp(-t^2)\}$, $|\Delta t|=|\Delta v/\{2t\cdot\exp(-t^2)\}|\leq \epsilon$, where $\epsilon$: allowable error.

The SN ratio is $S/N=1/\Delta v$. Therefore, the intersection Q need only exist in a time region satisfying $y=t\cdot\exp(-t^2)\geq 1/\{2(S/N)\cdot\epsilon\}$.

In other words, in FIG. 4C in which the curve represents $y=t\cdot\exp(-t^2)$, time $t_0$ at the intersection Q need only satisfy $T_1 \leq t_0 \leq T_2$.

Note that $T_1$ and $T_2$ indicate the values of the time t meeting $y=t\cdot\exp(-t^2)=1/\{2(S/N)\cdot\epsilon\}$.

Since the time $t_0$ is substantially half the delay $T_d$ in the second delay element 8, $T_1 \leq T_d/2 \leq T_2$.

The threshold value $1/\{2(S/N)\cdot\epsilon\}$ is inversely proportional to the SN ratio of the received signal and the allowable error $\epsilon$; the higher the SN ratio or the larger the allowable error, the smaller the threshold value and the larger the allowable width of the delay $T_d$.

As an example, when S/N=4 and $\epsilon$=0.6, $0.44 \leq T_d \leq 2.75$. On the basis of full-width at half maximum $2\sqrt{\ln 2}=1.67$ of the received optical pulse, $26\% \leq T_d \leq 165\%$.

The allowable width of the delay $T_d$ changes in accordance with the SN ratio of the received signal and the allowable error $\epsilon$ and the waveform of the received optical pulse. In practice, the allowable width is desirably about 30% to 100% of the full-width at half maximum of the received optical pulse.

FIG. 5 shows another example which can be used instead of the threshold generator 9 in FIG. 2.

An adder 26' adds the input/output values of the second delay element 8, and a peak hold (peak value holding circuit) 27 holds the peak value of the output from the adder 26'. A divider 28 supplies a half value of the peak value as a reference voltage to one terminal of the second comparator 11.

This reference voltage is equivalent to the voltage value at the intersection Q in FIG. 3A.

In FIG. 5, an arrow indicated by R represents a reset pulse.

The delay amount (time) of the first delay element 4 in FIG. 1 is so selected as to be substantially the same as the delay amount of the second delay element 8.

When the reception time and the emission time are to be determined by inputting a portion of the emitted output light to the second photodetector 6, it is necessary to correct the difference in delay time between an optical waveform detected by the first photodetector 2 and an optical waveform which is contained in signal light detected by the second photodetector 6 and serves as a reference of the emission time, e.g., in the case of the inside of an automobile, an optical waveform obtained by detecting scattered light from the windshield or a portion of the emitted output light.

To this end, the first delay element 4 consists of a fixed delay element and a variable delay element and thereby controls the delay amount.

As shown in FIG. 6, this variable delay element can be controlled by a signal from the signal generator 12. Referring to FIG. 6, a logic element 150 ANDs a portion of the output from the first comparator 5 and a portion of the output from a logic element 41 and feeds back their AND to the first delay element 4 through a conductor 151.

This operation is shown in FIGS. 7A to 7D.

FIG. 7A shows a received signal waveform obtained from scattered light from the windshield. FIG. 7B shows an output signal waveform from the first comparator 5, i.e., a signal waveform detected by the first photodetector.

If there is a slight delay error between the two waveforms, a waveform shown in FIG. 7C is obtained as an output from the logic element (exclusive OR) 41.

A rectangular pulse in FIG. 7D can be obtained by ANDing this output and a portion of the output from the comparator 5.

This rectangular pulse corresponds to the delay error described above. Therefore, the influence of the delay error can be reduced by controlling the variable portion of the delay element 4 such that the rectangular pulse is as close as possible to 0.

The signal generator 12 in FIG. 1 generates a digital output to be supplied to the integrator 13 by using the outputs from the first and second comparators 5 and 11.

The pulse width of this digital output is in proportion to the time the pulse requires to go and return the distance to the target.

FIG. 8 shows one practical example of this signal generator 12.

In this example, a portion of the emitted output light is input to the second photodetector 6 and used in determination of the reception time and the emission time.

Figure 9A:
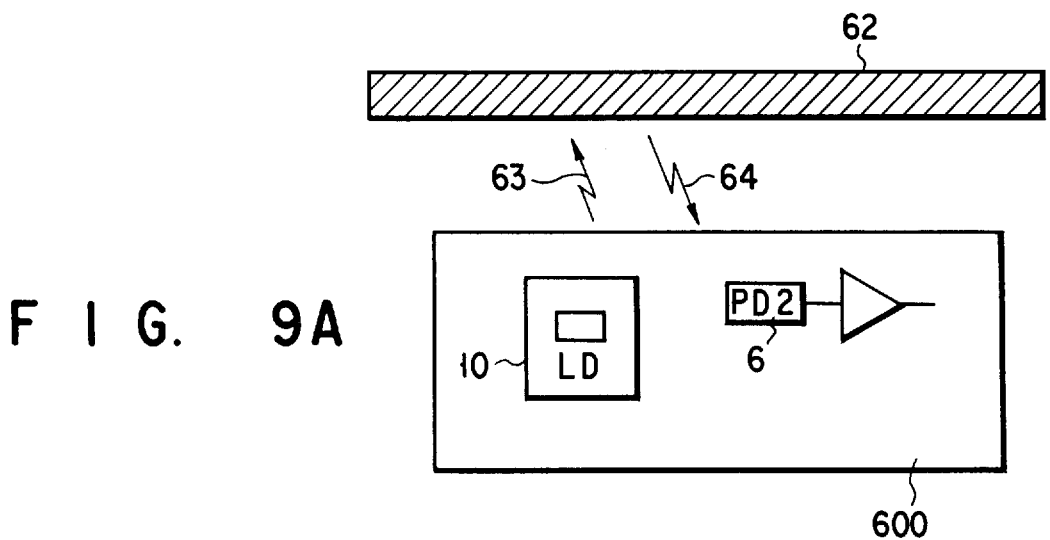
FIGS. 9A and 9B are views showing practical applications of the signal generator in FIG. 8.
Figure 9B:
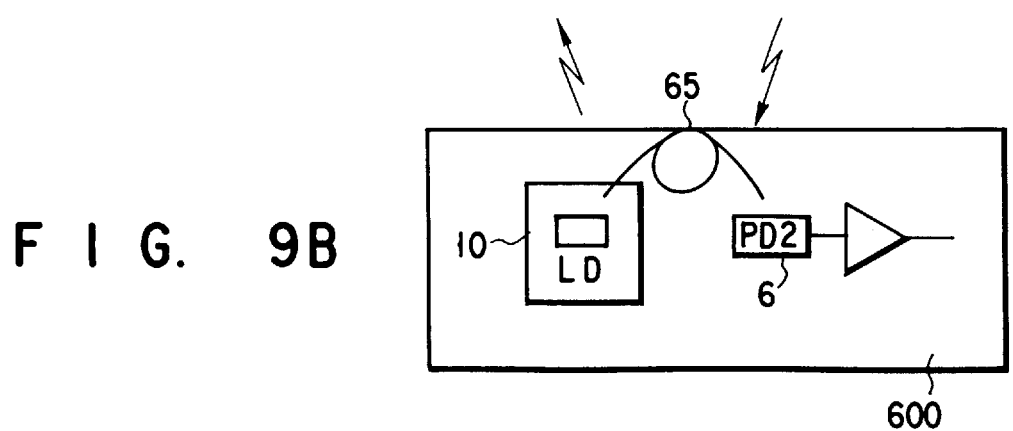

Practical applications are shown in FIGS. 9A and 9B.

In the former application, a portion of an emitted beam 63 is scattered by a windshield 62 arranged close to a distance sensor 600. This scattered light 64 enters the second photodetector 6.

In the latter application, a portion of the emitted light from the light-emitting unit 10 is sent into the second detector through an optical fiber loop 65.

This function will be explained below with reference to FIGS. 10A to 10F.

The logic element 41 in FIG. 8 obtains the exclusive OR (coincidence) of the outputs from the first and second comparators 5 and 11.

Referring to FIGS. 10A to 10C, a target at a close distance (FIG. 10A) is indicated by "CLOSE TARGET", and a target not at a close distance (FIG. 10D) is included in "DISTANT TARGET".

FIG. 10A shows the output from the second comparator 11 in a case wherein reflected light from a close target and scattered light from the windshield arranged close to the light-emitting unit cannot be separated and form a single wide pulse.

FIG. 10B shows the output from the first comparator 5. A pulse shown in FIG. 10C is obtained by obtaining the coincidence between the two outputs in FIGS. 10A and 10B.

Reflected light from a distant target shown in FIG. 10D is separated from the scattered light from the windshield.

A pulse shown in FIG. 10F is obtained by obtaining the coincidence between this reflected light and the output from the first comparator 5 shown in FIG. 10E.

The trailing edge of the pulse shown in FIG. 10B or 10E is used as a set (ON) signal for a flip-flop 43 (FIG. 8). The trailing edge of the pulse shown in FIG. 10C or 10F is used as a reset (OFF) signal for the flip-flop 43.

In other words, these signals are used as start and stop signals for the integrator 13 in FIG. 1.

A third delay element 42 is used to give a delay equivalent to the delay time in the logic element 41.

Reference numeral 44 denotes an output terminal.

The logic circuit shown in FIG. 8 can be used even when the scattered light from the windshield or a portion of the emitted output light is not used in the generation of the start signal for integration.

FIG. 11 shows another example of the signal generator 12.

The operation is shown in FIGS. 12A to 12J.

Figure 12:
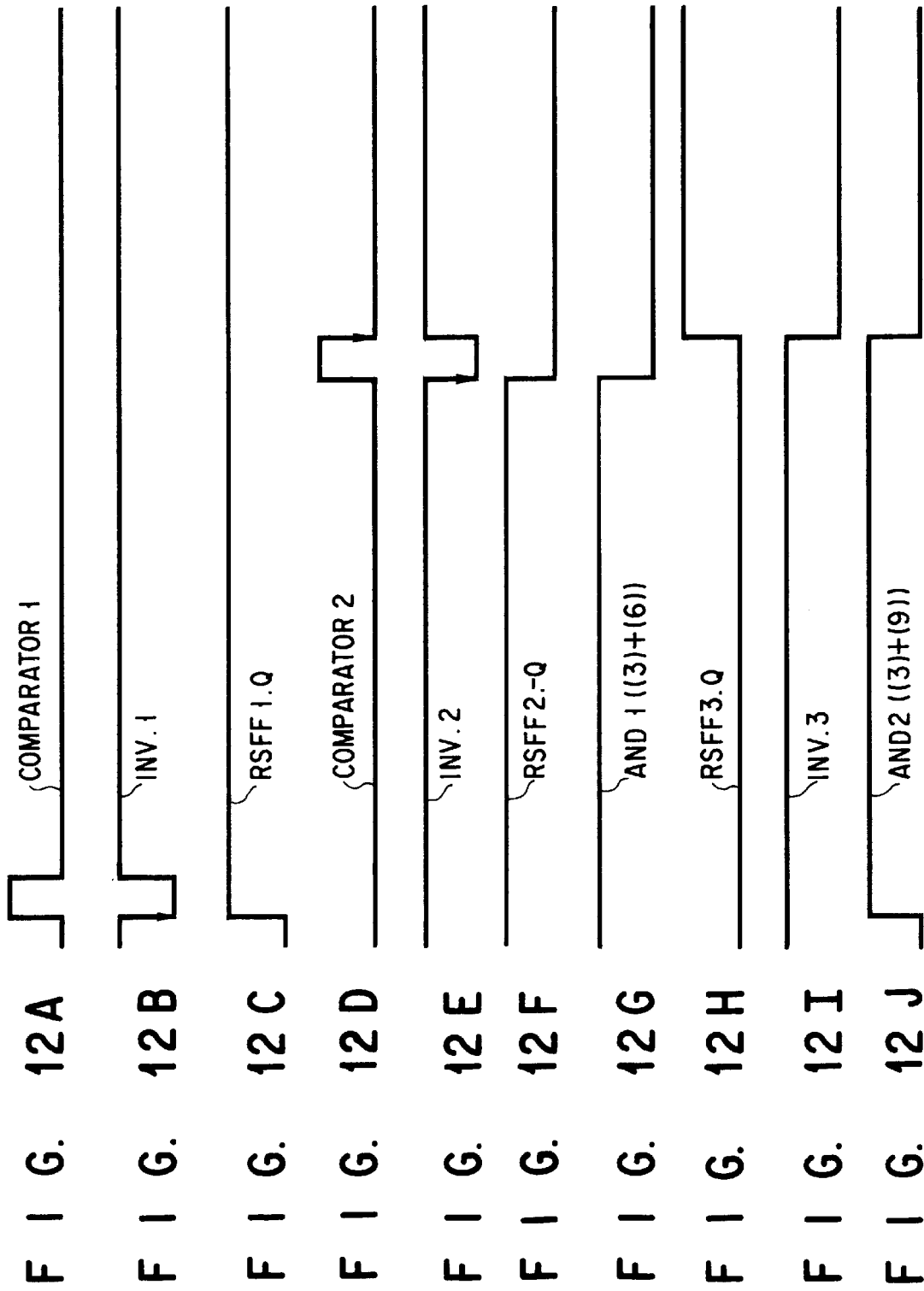
FIGS. 12A to 12J are timing charts for explaining the operation of the signal generator in FIG. 11.
Figure 15:
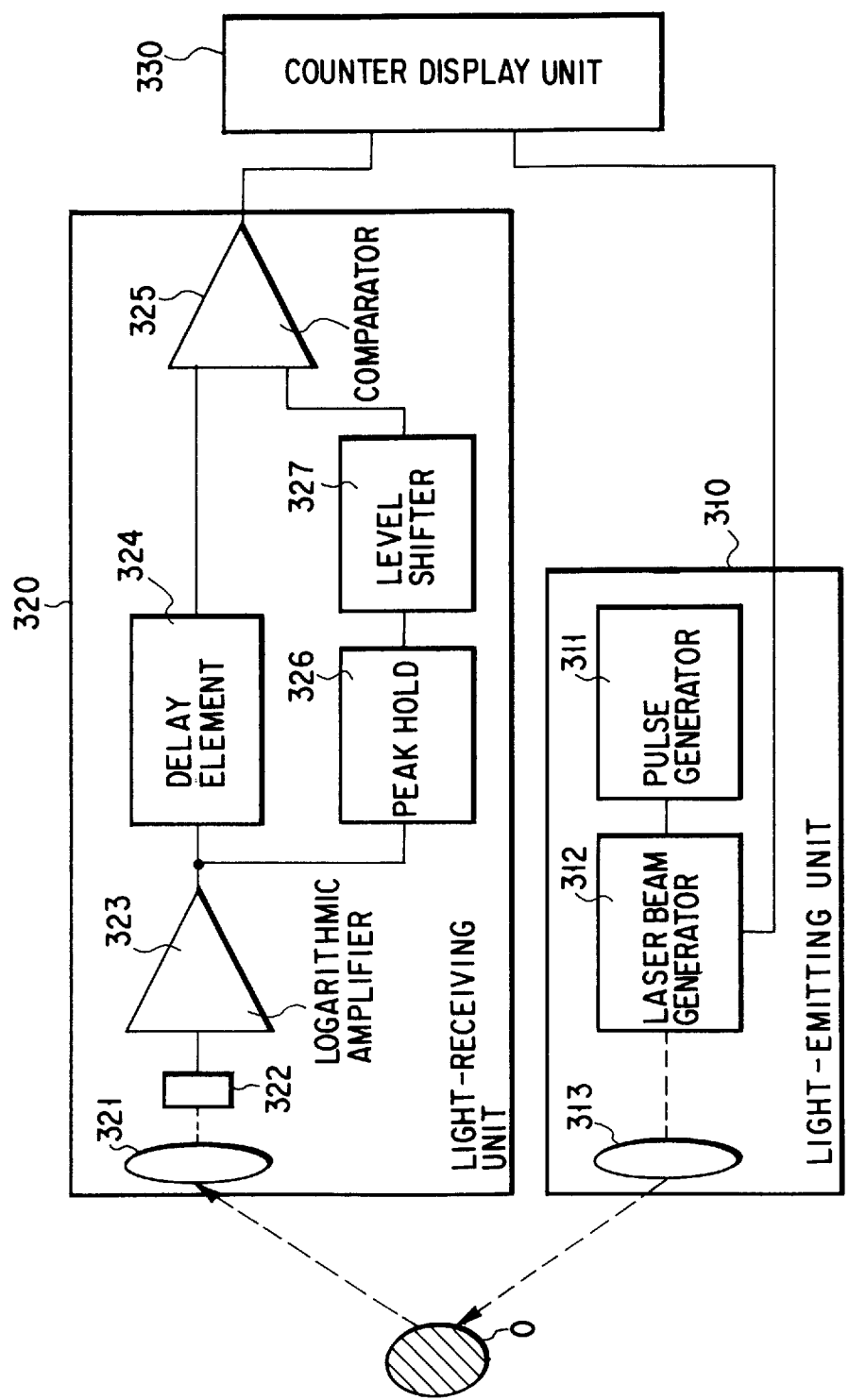
FIG. 15 is a block diagram showing one conventional distance measuring apparatus.

The output from the first comparator 5 is shown in FIG. 12A.

When this output is passed through a first inverter 55, a waveform shown in FIG. 12B is obtained.

When the output from this first inverter 55 is applied to a first flip-flop 56, the first flip-flop 56 is set (turned on) at the trailing edge of the output as shown in FIG. 12C.

The output from the second comparator 11 is indicated by the second comparator output in FIG. 12D and supplied from an input terminal 24.

A portion of the output is supplied to a third flip-flop 53, and the third flip-flop 53 is set (turned on) at the trailing edge of the second comparator output (FIG. 12D) as shown in FIG. 12H.

This output is passed through a third inverter 54, and logic circuits 58 and 60 AND this output and the output (FIG. 12C) from the first flip-flop 56. The result is a rectangular pulse shown in FIG. 12J.

Meanwhile, the rest of the output from the second comparator 11 supplied from the input terminal 24 is supplied to a second inverter 51 where the output is formed into a waveform which is the inversion of the waveform in FIG. 12D.

This waveform is supplied to a second flip-flop 52, and its inverted output is obtained. The result is a waveform shown in FIG. 12F.

Logic circuits 57 and 59 AND the waveform shown in FIG. 12F and the output (FIG. 12C) from the flip-flop 56 and produce a rectangular pulse shown in FIG. 12G.

These rectangular pulses in FIGS. 12G and 12J represent two cases of set (ON) by the output from the first comparator 5 and reset (OFF) at the leading or trailing edge of the output rectangular pulse (FIG. 12D) from the second comparator 11 which corresponds to the received optical pulse.

When an adder 50 adds the two rectangular pulses, the sum of the pulse widths of these rectangular pulses (FIGS. 12G and 12J) is output to the output terminal 44.

When this output is divided by 2, the average value of the pulse widths of the rectangular pulses (FIGS. 12G and 12J) is obtained.

That is, the center (peak position) of the pulse is approximately obtained.

The integrator 13 performs voltage-current conversion for the output voltage from the signal generator 12 and stores charge proportional to the pulse width. If the target is at a long distance, the time the optical pulse requires to go and return is long. Therefore, the signal generator 12 supplies a digital output with a large pulse width to the integrator 13, so the integrator 13 stores a large amount of charge.

A voltage corresponding to this charge amount is output to the output terminal 14.

The relative speed with respect to the object can be calculated by a computer (not shown) from the time series data of the output distance.

Functions shown in FIGS. 13 and 14 can be added to the integrator 13. Referring to FIG. 13, the output from the signal generator 12 is supplied to an input terminal 91. A reset pulse signal generator 93 counts reset pulses supplied from a CPU to an input terminal 94. When the count reaches predetermined number N, the reset pulse signal generator 94 supplies a reset pulse 92 to the integrator 13.

With this arrangement, a voltage corresponding to the total sum of charge amounts obtained when measurement is performed N times is output to the output terminal 14.

The average value of the N-time measurements can be calculated by dividing this output by N.

Also, the relative speed with respect to the target can be calculated by the configuration shown in FIG. 14.

In FIG. 14, reference numeral 13 denotes an integrator; 100, a speed detector; 103, a switch controlled by a control signal 104 from a controller, e.g., a CPU; 107, a charger controlled by a voltage supplied through a conductor 105; 108, a discharger controlled by a conductor 106; 109, a capacitor; and 110, an output terminal.

The speed detector 100 is an advanced version of the reset function shown in FIG. 13 and performs speed detection as follows. Assume that measurement is successively performed 2N (N≧1) times. First, in FIG. 14 the switch 103 is closed to the charger 107 by the control signal 104 from the CPU, and distance measurement is performed N times.

Charge corresponding to the distance is moved from the integrator 13 to the capacitor 109 via the charger 107.

In other words, the integrator is reset.

Subsequently, the switch 103 is closed to the conductor 106 by the control signal from the CPU, and distance measurement is performed N times.

Charge corresponding to the distance is released from the capacitor 109 to the discharger 108.

This can also be said to be a kind of reset.

If the relative speed with respect to the target is 0, equal amounts of charge and discharge are performed, so the charge stored in the capacitor 109 is 0.

If the relative speed is not 0, charge corresponding to the speed is stored, and the corresponding voltage is output to the output terminal 110. Consequently, the relative speed is detected from the average time difference between the two sets of measurements.

In this explanation, it is assumed that measurement is successively performed 2N times. However, the first N-time measurements and the second N-time measurements can also be separated.

It is also possible to change the number N in accordance with the danger of collision determined by the CPU or with a plurality of targets.

The characteristic feature of this embodiment is that a value in a portion around the peak of received signal light, where the signal intensity drastically changes, is chosen as a threshold value, so the operation is less affected by noise because the signal intensity change is larger than that at the peak.

The characteristic feature of the threshold generator in FIG. 5 is that the generator can respond more rapidly than the switch 25 shown in FIG. 2 and hence is suited to high-speed processing.

The characteristic feature of the signal generator in FIG. 8 is that scattered light from the windshield or a portion of emitted output light can be used as a start signal for integration and signal light from a target can be used as a stop signal for integration. Since the start and stop signals use a common signal processing circuit, the signal generator is not easily affected by changes in characteristics with temperature changes in the digital circuit.

The characteristic features of the signal generator in FIG. 11 are as follows. The three routes corresponding to the first, second, and third flip-flops 52, 53, and 56 of the logic circuit basically have the same delay time. Therefore, the signal generator is not easily affected by changes in characteristics with temperature changes. Additionally, the signal generator maintains the above-mentioned advantage that a value in a portion around the peak of signal light, where the signal intensity drastically changes, is selected as a threshold value, and at the same time effectively uses two pieces of information corresponding to the leading and trailing edges of the width of the received optical pulse. Consequently, the peak of the optical pulse is also approximated.

The integrator 13 can store charge in accordance with very small changes in the width of the output pulse from the signal generator, so the problem of minimum resolution occurring when a high-speed counter is used can be avoided. The integrator 13 also has the advantage that the reset function in FIG. 13 or the function of the speed detector in FIG. 14 can be easily added.

Since the reset function in FIG. 13 is realized by hardware, the average value of a plurality of number of times of distance measurement can be calculated at a high speed.

The speed detector in FIG. 14 is an advanced version of this reset function and can rapidly detect the relative speed with respect to a target.

As another advantage, programs for relative speed detection can be selected in accordance with the degree of danger or the surrounding circumstances.

Various modifications and changes of this embodiment are possible.

For example, the first photodetector need not be incorporated into the light source, and a portion of the emitted optical output can be detected by a separately arranged photodetector.

Also, instead of setting a predetermined value as the threshold value of the first comparator, it is possible to use the threshold setting method in FIG. 2 or 5.

Various modifications of the logic circuit of the signal generator are possible.

Furthermore, it is of course possible to use a high-speed counter instead of the integrator.

FIG. 19 shows another embodiment of a distance measuring apparatus according to the present application. Reference numeral 6 denotes a light-receiving element for detecting scattered light from a target obstacle or target, which receives the scattered light via a convergent optical system (not shown). Reference numeral 7 denotes a preamplifier; 200, a delay element; 11, a comparator; 12, a signal generator; and 203, a buffer amplifier. A trigger pulse for driving the light source is input to an input terminal 201, and a distance signal is output from an output terminal 202.

Figure 21B:
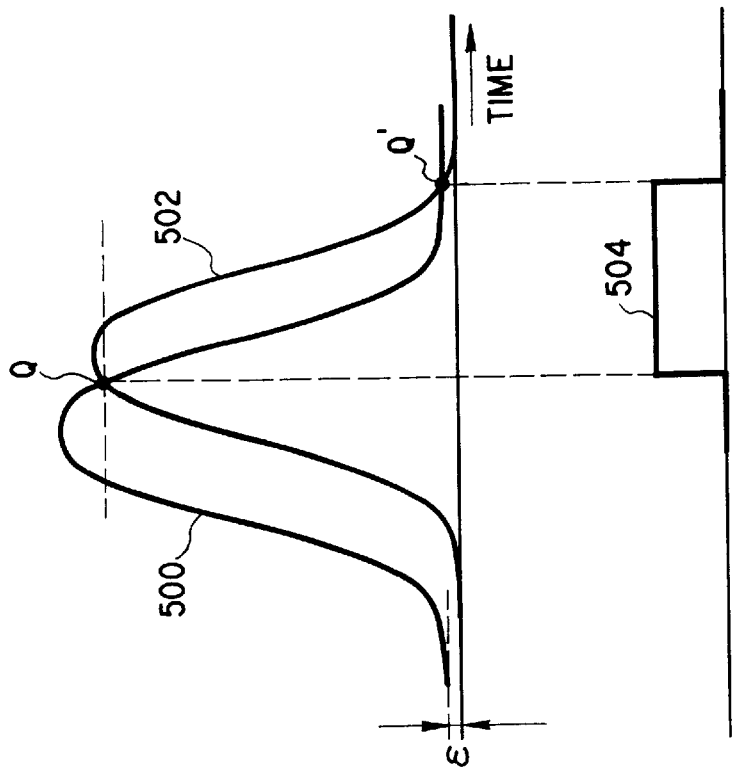
FIGS. 21A and 21B are charts showing signal waveforms in FIGS. 19 and 20.
Figure 21A:
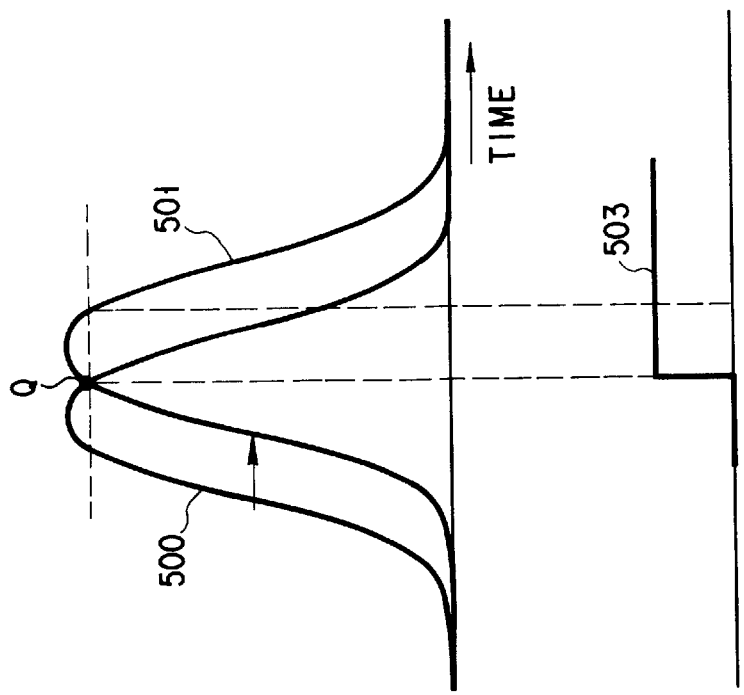

FIG. 21A is a view showing a signal waveform in FIG. 19. A waveform 500 is a received signal waveform and represents an output from the preamplifier 7. A portion of this output is directly supplied to one input terminal of the comparator 11. The rest of the output passes through the delay element 200 to have a waveform 501, and is supplied to the other input terminal of the comparator 11. A waveform 503 is the output waveform of the comparator 11. The signal is inverted at an intersection Q of the waveforms 500 and 501. The trigger pulse supplied to the input terminal 201 in FIG. 19 is input to the signal generator 12 via a buffer amplifier 203 and used as a start pulse (emission time) for obtaining the distance signal. The output from the comparator 11 is input to the signal generator 12 and used as a stop pulse (reception time) for obtaining the distance signal.

In this example, only the leading edge of the inverted output from the comparator 11 is used, unlike in the example of FIG. 3 described above. If the full-width at half maximum of an optical pulse emitted from a light-emitting unit (not shown) is short (e.g., 10 ns or smaller), the leading edge actually functions as the stop pulse of a distance measurement signal. In this case, the threshold generator 9 shown in the example of FIG. 1 is advantageously omitted.

FIG. 20 is a view for explaining a modification of the embodiment in FIG. 19. In this modification, a linear conversion circuit 205 for multiplying the level shift $\epsilon$ and the amplitude by a coefficient is added midway along the wiring from the preamplifier 7 directly to the comparator 11 in FIG. 19.

FIG. 21B is a view showing a signal waveform in the modification of FIG. 20. Compared to FIG. 21A, the waveform 500 side not passing through the delay element 100 is shifted upward by the function of the linear conversion circuit 205, and amplified in order not to invert the comparator output at the noise level. With this setting, another intersection Q' is formed in addition to the intersection Q. Of the intersections Q and Q', the former is significant, and the leading edge of a waveform 504 is used as the above-described stop signal, while the latter supplies a spurious signal.

Also in this example, if the full-width at half maximum of the optical pulse emitted from the light-emitting unit (not shown) is short (e.g., 10 ns or smaller), similar to the example of FIG. 19 described above, the leading edge actually functions as the stop pulse of the distance measurement signal. In this case, the threshold generator 9 shown in the example of FIG. 1 is advantageously omitted.

Note that the pulse not subjected to delay is amplified (shifted upward) in FIG. 21B. If the linear conversion circuit 105 is arranged in series with the delay element 200 in FIG. 20 to shift the delayed pulse side downward, the same effect can be obtained.

No delay element identical to that the delay element 4 in FIG. 1 is inserted between the input terminal 201 and the buffer amplifier 203 in the examples of FIGS. 19 and 20 because the compensation amount of the delay element 4 may be corrected after the emission/reception time or the distance is obtained without any delay.

As is apparent from the above description, in the distance measuring apparatus of the present invention, the received optical pulse is converted into an electrical signal pulse, and this electrical signal pulse is divided into two pulses. After only one signal pulse is passed through a delay element, the two signal pulses are supplied to a threshold generator. This threshold generator generates and holds the value of the signal intensity at the intersection of the waveforms of the two pulses, as a threshold value of the received signal pulse. By using the generated threshold value, a comparator generates a digital signal pulse indicating the reception time from the received signal pulse. Accordingly, a value in a portion around the peak of the received signal light, where the signal intensity drastically changes, is selected as the threshold value.

In the present invention, therefore, the signal intensity change is larger than that at the peak, so the operation is less affected by noise.

Also, the pulse width of the digital output from the signal generator corresponds to the time the optical pulse requires to go and return the distance to the target. Therefore, the amount of charge stored by integrating this pulse width by the integrator takes a value corresponding to the time or the distance to the target.

Since this value continuously changes, factors limiting the measurement accuracy or the resolution are restricted to those determined by the SIN ratio of the signal. That is, the measurement accuracy or the resolution is not restricted by the minimum time resolution of one count of a clock pulse.

Accordingly, as has been described in detail above, the present invention can provide a distance measuring apparatus capable of high-accuracy, high-speed distance measurement with a simple arrangement even when the intensity of the received optical pulse changes.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. An apparatus for measuring a distance to a target by measuring a time that an emitted light pulse takes to travel to the target and back, comprising:

converting means for receiving a light pulse reflected by the target, and for converting the light pulse into an electrical signal;

a delay element for delaying a pulse of the electrical signal so as to generate a delayed electrical signal;

a threshold generator for receiving the electrical signal from the converting means and the delayed electrical signal from the delay element, and for holding, as a threshold, a signal level at which the electrical signal from the converting means and the delayed electrical signal from the delay element are coincident; and a comparator for comparing the delayed electrical signal from the delay element and the threshold held by the threshold generator, and for generating a signal whose width corresponds to a length of time during which the delayed electrical signal from the delay element exceeds the threshold held by the threshold generator.

2. An apparatus according to claim 1, further comprising a linear conversion circuit for shifting an output level of one of the electrical signal from the converting means and the delayed electrical signal from the delay element.

3. An apparatus according to claim 2, wherein the linear conversion circuit comprises means for multiplying, by a coefficient, one of the electrical signal from the converting means and the delayed electrical signal from the delay element.

4. A distance measuring apparatus for measuring a time an emitted light pulse requires to travel to and return from a target before being received by using an emission time and a reception time of the optical pulse, and for obtaining a distance to the target from the measured time, said apparatus comprising:

a light-emitting unit for emitting an optical pulse;

a first photodetector for detecting an output from said light-emitting unit;

a first comparator for comparing an output from said first photodetector with a predetermined threshold value;

a second photodetector for receiving scattered light from the target;

a delay element for delaying an output from said second photodetector so as to generate a delayed electrical signal;

a threshold generator for holding, as a threshold value, a value of signal intensity at an intersection of the output from said second photodetector and the delayed electrical signal from said delay element;

a second comparator for comparing the delayed electrical signal from said delay element with the threshold value held by said threshold generator, and for generating a signal whose width corresponds to a length of time during which the delayed electrical signal from said delay element exceeds the threshold value held by said threshold generator;

a signal generator for generating an output corresponding to the emission time and the reception time based on an output from said first comparator and an output from said second comparator; and an integrator for integrating the output from said signal generator.

5. An apparatus according to claim 4, wherein said light-emitting element comprises means for sending a portion of the emitted optical pulse to said second photodetector.

6. An apparatus according to claim 4, wherein a delay time by which said delay element delays the output from said second photodetector is equivalent to 30 to 100% of a full-width at a half maximum of the received optical pulse.

7. An apparatus according to claim 4, wherein said threshold generator determines the threshold value based on the output from said second comparator, which is fed back to said threshold generator.

8. An apparatus according to claim 4, further comprising a second delay element for delaying the output from said first photodetector.

9. An apparatus according to claim 8, wherein said second delay element comprises a fixed delay element having a fixed delay amount and a variable delay element having a variable delay amount controlled by the output from said signal generator.

10. An apparatus according to claim 4, wherein said signal generator comprises a logic circuit for exclusively ORing the output from said first comparator and the output from said second comparator, a third delay element for delaying the output from said first comparator, and a flip-flop which is turned on (set) by an output from said third delay element and turned off (reset) by an output signal from said logic circuit.

11. An apparatus according to claim 4, wherein said signal generator outputs a digital output equivalent to a start signal for said integrator in accordance with the output from said first comparator, and outputs digital outputs equivalent to two different stop signals for said integrator in accordance with leading and trailing edges of the output from said second comparator.

12. An apparatus according to claim 4, further comprising a reset pulse signal generator for applying a reset signal to said integrator after the distance is measured a plurality of times.

13. An apparatus according to claim 4, further comprising a speed detector having a switch for switching a route of a portion of the output from said integrator, a controller for controlling the switch, a charger and a discharger connected to said switch, and a capacitor connected to said charger and said discharger.

14. A distance measuring apparatus for measuring a time an emitted optical pulse requires to travel to and return from a target before being received by using an emission time and a reception time of the optical pulse, and for obtaining a distance to the target from the measured time, said apparatus comprising:

- converting means for converting a received optical pulse into an electrical signal as a received electrical signal pulse;
- a delay element for delaying the received electrical pulse signal so as to generate a delayed electrical signal pulse;
- a threshold generator for holding, as a threshold value, a half value of a peak value of a sum of the received electrical signal pulse and the delayed electrical signal pulse; and
- a comparator for comparing the delayed electrical signal and the threshold held by the threshold generator, and for generating a signal whose width corresponds to a length of time during which the delayed electrical signal exceeds the threshold value held by said threshold generator.

15. An apparatus according to claim 14, wherein a delay time by which said delay element delays the output from said second photodetector is equivalent to 30 to 100% of a full-width at a half maximum of the received electrical signal pulse.

16. An apparatus according to claim 1, wherein a delay time $T_d$ by which said delay element delays the pulse of the electrical signal satisfies the following condition:

$$T_1 \leq T_2/2 \leq T_2$$

where $T_1$ and $T_2$ are the values of a time t, wherein:

$$t \cdot \exp(-t^2) = 1/\{2(S/N \cdot \epsilon)\}$$

and where S/N is a SN ratio, and $\epsilon$ is an allowable error.

17. A distance measuring apparatus for measuring a time an emitted optical pulse requires to travel to and return from a target before being received by using an emission time and a reception time of the optical pulse, and for obtaining a distance to the target from the measured time, said apparatus comprising:

- a light-emitting unit for emitting an optical pulse;
- a first photodetector for detecting an output from said light-emitting unit;
- a first comparator for comparing an output from said first photodetector with a predetermined threshold value;
- a second photodetector for receiving scattered light from the target;
- a delay element for delaying an output from said second photodetector so as to generate a delayed electrical signal;
- a threshold generator for holding, as a threshold value, a value of signal intensity at an intersection of the output from said second photodetector and the delayed electrical signal from said delay element;
- a second comparator for comparing the delayed electrical signal from the delay element and the threshold value held by the threshold generator, and for generating a signal whose width corresponds to a length of time during which the delayed electrical signal from the delay element exceeds the threshold held by the threshold generator;
- an exclusive OR circuit for calculating an exclusive OR of an output of the first comparator and an output of the second comparator;
- a signal generator for generating an output corresponding to the emission time and the reception time based on the output from said first comparator and an output from the exclusive OR circuit; and
- an integrator for integrating the output from said signal generator.

* * * * *